United States Patent
Jufuku

(10) Patent No.: US 8,016,062 B2
(45) Date of Patent: Sep. 13, 2011

(54) MOVING BODY

(75) Inventor: Yasunobu Jufuku, Mishima (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 390 days.

(21) Appl. No.: 12/299,844

(22) PCT Filed: Dec. 3, 2007

(86) PCT No.: PCT/JP2007/073728
§ 371 (c)(1),
(2), (4) Date: Nov. 6, 2008

(87) PCT Pub. No.: WO2008/069326
PCT Pub. Date: Jun. 12, 2008

(65) Prior Publication Data
US 2009/0101423 A1 Apr. 23, 2009

(30) Foreign Application Priority Data
Dec. 5, 2006 (JP) ................................ 2006-327778

(51) Int. Cl.
*B60K 1/00* (2006.01)
(52) U.S. Cl. ..................................... 180/65.31; 180/68.5
(58) Field of Classification Search .................. 180/65.1, 180/65.3, 65.8, 68.5, 301, 302, 65.31
See application file for complete search history.

(56) References Cited

U.S. PATENT DOCUMENTS

| 6,220,380 | B1 * | 4/2001 | Mita et al. | 180/65.1 |
|---|---|---|---|---|
| 6,648,085 | B2 * | 11/2003 | Nagura et al. | 180/65.1 |
| 6,907,947 | B2 * | 6/2005 | Morita et al. | 180/65.1 |
| 6,978,855 | B2 * | 12/2005 | Kubota et al. | 180/65.1 |
| 7,240,752 | B2 * | 7/2007 | Takahashi et al. | 180/65.1 |
| 7,270,202 | B2 * | 9/2007 | Kondo | 180/65.1 |
| 7,353,900 | B2 * | 4/2008 | Abe et al. | 180/65.31 |
| 7,631,712 | B2 * | 12/2009 | Watanabe | 180/68.5 |
| 2002/0189873 | A1 * | 12/2002 | Mizuno | 180/65.3 |
| 2005/0280166 | A1 * | 12/2005 | Katagiri et al. | 261/75 |

FOREIGN PATENT DOCUMENTS

| JP | 5 174862 | 7/1993 |
|---|---|---|
| JP | 11 111316 | 4/1999 |
| JP | 2002 198077 | 7/2002 |
| JP | 2002 208423 | 7/2002 |
| JP | 2004 146303 | 5/2004 |
| JP | 2004 207106 | 7/2004 |

(Continued)

*Primary Examiner* — Hau Phan
(74) *Attorney, Agent, or Firm* — Oblon, Spivak, McClelland, Maier & Neustadt, L.L.P.

(57) ABSTRACT

A moving body is equipped with fuel cells structured to have multiple corners. The fuel cells have a fuel gas exhaust port formed to discharge a fuel gas, which is subjected to an electrochemical reaction at anodes of the fuel cells, out of the fuel cells. The fuel cells are arranged to be inclined to a horizontal plane to position a front side of the fuel cells in a forward direction of the moving body higher than an opposite side of the fuel cells in the forward direction of the moving body and are provided to locate a specific corner closest to the fuel gas exhaust port of the fuel cells among the multiple corners as a lowermost point. This arrangement enables water produced at the anodes of the fuel cells to be efficiently discharged from the fuel cells by taking advantage of the gravity, while the moving body moves on a slope.

11 Claims, 4 Drawing Sheets

FOREIGN PATENT DOCUMENTS

| | | |
|---|---|---|
| JP | 2005 203150 | 7/2005 |
| JP | 2005 228580 | 8/2005 |
| JP | 2006 62548 | 3/2006 |
| JP | 2006 218894 | 8/2006 |

\* cited by examiner

A-A Cross Section

MOVING BODY

TECHNICAL FIELD

The present invention relates to a technique of arranging fuel cells on a predetermined moving body.

BACKGROUND ART

Fuel cells may be mounted on a vehicle as an electric power supply source. An inclined arrangement of fuel cells enables collection of water produced in the fuel cells by taking advantage of the gravity and discharge of the collected water out of the fuel cells through a reactive gas exhaust outlet (see, Japanese Patent Laid-Open No. 2002-198077).

The vehicle may go up or down a hill (slope). Especially when the vehicle goes on an upslope, a large supply of electric power from the fuel cells is required. This may lead to instantaneous production of a large amount of water in the fuel cells. The simple inclined arrangement of the fuel cells as disclosed in the above cited patent document 1 may cause the inclination to be compensated by the angle of the hill (slope) and make it difficult to discharge the produced water from the fuel cells by taking advantage of the gravity. Accumulation of the produced water causes flooding in the fuel cells and undesirably lowers the power generation efficiency of the fuel cells to prevent a smooth drive of the vehicle. This problem may also arise while the vehicle runs on a downhill slope.

The inclined arrangement of the fuel cells in the vehicle leaves a marginal space under a bottom face (lower face) of the fuel cells.

The amount of the reactive gas discharged from the anodes is generally less than the amount of the reactive gas discharged from the cathodes in the fuel cells. There is accordingly a higher potential for accumulation of the produced water and the occurrence of flooding at the anodes rather than at the cathodes. These problems are not restricted to the vehicle but are commonly found in various moving bodies equipped with fuel cells, for example, a linear motor car, a ship or boat, an airplane, or a robot.

DISCLOSURE OF THE INVENTION

There would thus be a demand for enabling efficient discharge of water produced at anodes of fuel cells by taking advantage of the gravity while a moving body equipped with the fuel cells moves on a slope. There would also be a demand for ensuring the efficient use of a marginal space left under a lower face of fuel cells arranged in an inclined manner in a moving body.

The present invention accomplishes at least part of the demands mentioned above and the other relevant demands by the following configurations applied to the moving body.

According to one aspect, the invention is directed to a moving body equipped with fuel cells structured to have multiple corners. The fuel cells have a fuel gas exhaust port formed to discharge a fuel gas, which is subjected to an electrochemical reaction at anodes of the fuel cells, out of the fuel cells. The fuel cells are arranged to be inclined to a horizontal plane to position a front side of the fuel cells in a forward direction of the moving body higher than an opposite side of the fuel cells in the forward direction of the moving body and are provided to locate a specific corner closest to the fuel gas exhaust port of the fuel cells among the multiple corners as a lowermost point.

Water produced at the anodes of the fuel cells is dischargeable by taking advantage of the gravity, while the moving body moves on a slope. The fuel cells are preferably structured in a polygonal columnar shape (for example, a rectangular prism shape) having multiple corners. The corners may include chamfered corners of the polygonal columnar shape.

In one preferable application of the moving body according to the above aspect of the invention, the fuel cells have an oxidizing gas exhaust port formed to discharge an oxidizing gas, which is subjected to an electrochemical reaction at cathodes of the fuel cells, out of the fuel cells. The fuel gas exhaust port is provided at a position closer to the specific corner as the lowermost point than at least the oxidizing gas exhaust port in the fuel cells.

The moving body of this arrangement enables efficient collection of water produced at the anodes of the fuel cells by taking advantage of the gravity and subsequent efficient discharge of the collected water out of the fuel cells through the fuel gas exhaust port by taking advantage of the gravity.

In one preferable embodiment of the invention, the fuel cells are structured as a cell laminate of multiple separators and multiple membrane electrode assemblies and have an end plate with the fuel gas exhaust port formed therein. The moving body has: a support member provided to support the fuel cells and arrange the fuel cells in an inclined orientation; a mount fastened to the support member and at least partly made of an elastic material; and a mount fixation member provided to fix the mount to the end plate of the fuel cells.

In the moving body of this embodiment, the fuel cells are securely fixable to and supportable by the support member. The presence of the elastic mount located between the end plate of the fuel cells and the support member desirably relieves the external force applied to the vehicle and transmitted to the support member.

In another preferable embodiment of the invention, the moving body has a fluid introduction assembly located in a space formed below a lower face of the fuel cells, which includes the lowermost point, and arranged to introduce an exhaust fluid from the fuel cells.

The moving body of this embodiment ensures the efficient use of the space produced by the inclined arrangement of the fuel cells and enables the easy introduction of the reactive gas and the water discharged from the fuel cells to the fluid introduction assembly.

According to another aspect, the invention is also directed to a moving body equipped with fuel cells. The fuel cells are arranged to be inclined to a horizontal plane. The moving body has a fluid introduction assembly located in a space formed below a lower face of the fuel cells, which includes a specific corner of the fuel cells as a lowermost point, and arranged to introduce an exhaust fluid from the fuel cells.

The moving body according to this aspect of the invention ensures the efficient use of the marginal space under the lower face of the fuel cells.

In the moving body equipped with the fluid introduction assembly, the fluid introduction assembly is preferably a diluter or a gas liquid separator. Such arrangement of the fluid introduction assembly enables the easy introduction of the reactive gas and the water discharged from the fuel cells to the diluter or the gas liquid separator as the fluid introduction assembly.

The moving body is preferably a vehicle. Water produced at the anodes of the fuel cells is efficiently dischargeable by taking advantage of the gravity, while the vehicle runs on a slope.

In the vehicle constructed as the moving body, it is preferable that the fuel cells are located under a driver's seat or passenger seat. This arrangement ensures the efficient use of the space in the vehicle.

The technique of the invention is not restricted to the moving body having any of the arrangements described above but is also actualized by a vehicle, a robot, or another device configuration, as well as a method configuration, such as a method of arranging fuel cells in a moving body.

BEST MODES OF CARRYING OUT THE INVENTION

A. Embodiment

A1. Structure of Fuel Cell Stack 100

Figure 1:
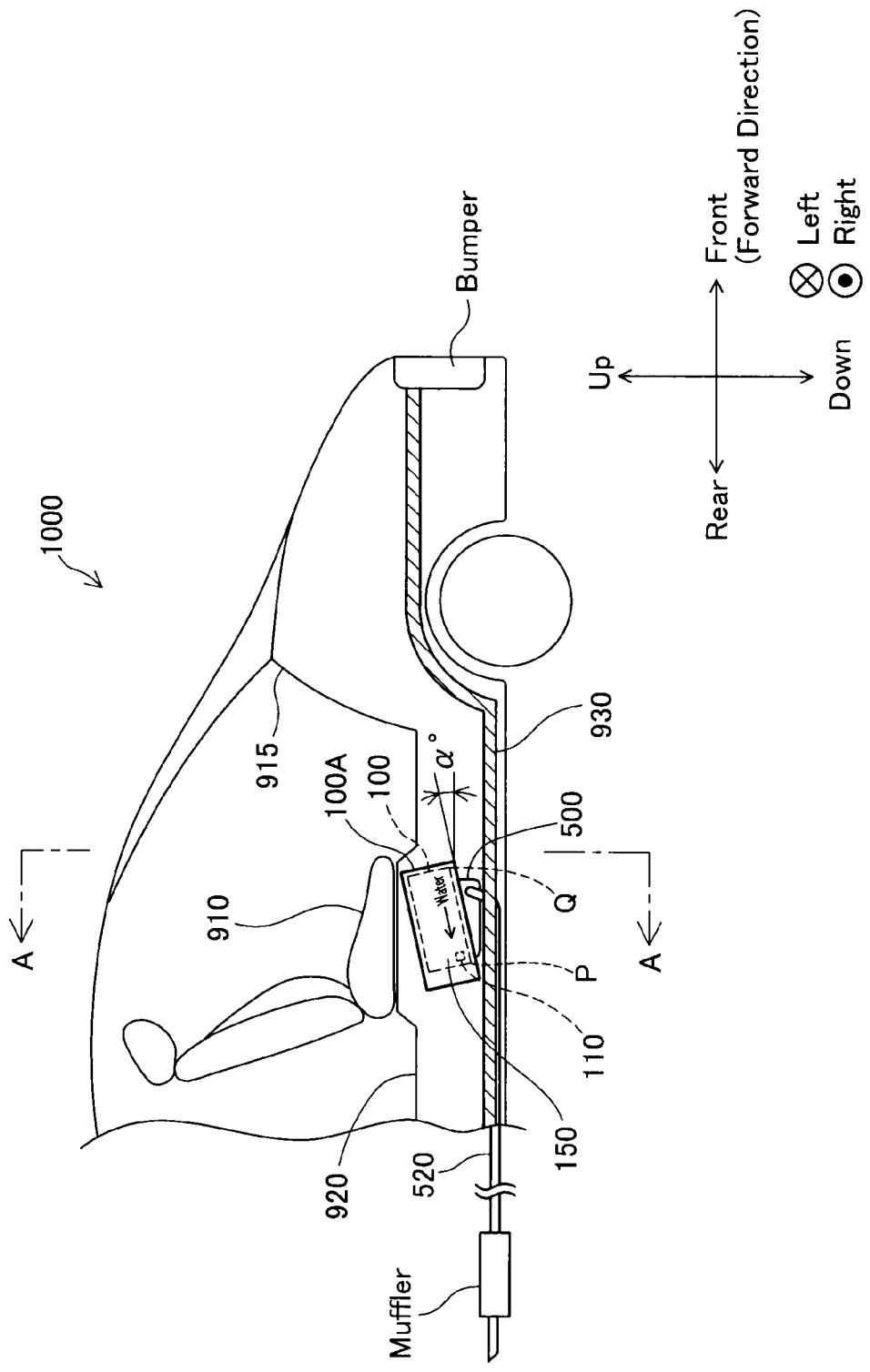
FIG. 1 is a schematic configuration diagram showing the position of a fuel cell stack 100 in a vehicle 1000 according to one embodiment of the invention.

FIG. 1 is a schematic configuration diagram showing the position of a fuel cell stack 100 in a vehicle 1000 according to one embodiment of the invention. The structure of the fuel cell stack 100 is described first. The fuel cell stack 100 is constructed as a laminate of multiple unit cells (not shown) stacked between a pair of end plates 150 and has a quasi-cube shape. A fuel cell casing 100A has a similar quasi-cube shape to receive the fuel cell stack 100 therein. The fuel cell stack 100 has a fuel gas supply manifold (not shown) arranged to supply a fuel gas to anodes (not shown) of the respective unit cells, an oxidizing gas supply manifold (not shown) arranged to supply an oxidizing gas to cathodes (not shown) of the respective unit cells, a fuel gas discharge manifold 160 (not shown in FIG. 1) arranged to collect the remaining fuel gas unconsumed by the electrochemical reaction at the anodes and discharge the collected fuel gas out of the fuel cell stack 100, and an oxidizing gas exhaust manifold (not shown) arranged to collect the remaining oxidizing gas unconsumed by the electrochemical reaction at the cathodes and discharge the collected oxidizing gas out of the fuel cell stack 100. These manifolds are formed in parallel to the laminating direction of the unit cells and are connected with corresponding ports provided in the end plates 150. FIG. 1 shows only a fuel gas exhaust port 110. The ports other than the fuel gas exhaust port 110 will be explained later. The fuel gas exhaust port 110 connects with the fuel gas exhaust manifold 160 to discharge the fuel gas out of the fuel cell stack 100.

The fuel cell stack 100 formed in the quasi-cube shape has eight apexes including one arbitrary apex P. The fuel gas exhaust manifold 110 is formed at a position closest to the apex P among the eight apexes of the fuel gas stack 100 and at a position closer to the apex P than the other ports (for example, an oxidizing gas exhaust port 120 as explained later).

In the structure of each unit cell, a membrane electrode assembly (MEA) including an electrolyte membrane (not shown) interposed between a pair of catalyst electrode layers (not shown) is placed between a pair of electrically conductive plates (separators).

A2. Position of Fuel Cell Stack 100 in Vehicle

A longitudinal or front-rear direction, a left-right direction, and a vertical or up-down direction are defined in the vehicle 1000 of the embodiment as shown in FIG. 1. The 'front' direction represents a forward direction of the vehicle 1000, which is also equivalent to a horizontal direction in FIG. 1. The fuel cell stack 100 is received in the fuel cell casing 100A and is located below a driver's seat or passenger seat 910 under a floor panel 920 as shown in FIG. 1. The fuel cell stack 100 is attached to a side frame 930 located under the floor panel 920 by means of a mounting structure as explained later.

A3. Arrangement of Fuel Cell Stack 100

Figure 2:
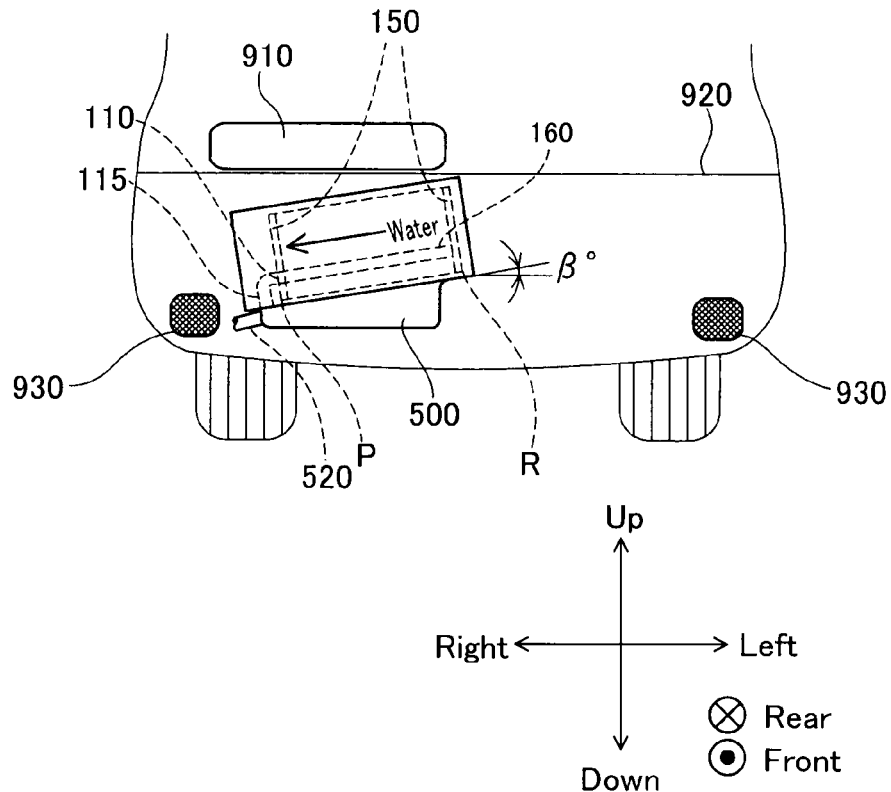
FIG. 2 is a perspective sectional view taken on the line A-A in FIG. 1.

FIG. 2 is a perspective sectional view taken on the line A-A in FIG. 1. As shown in FIGS. 1 and 2, the fuel cell stack 100 is provided to locate the apex P on a rear side in the longitudinal direction and on a right side in the left-right direction and is inclined to have the apex P as a lowermost point as discussed below.

Figure 3:
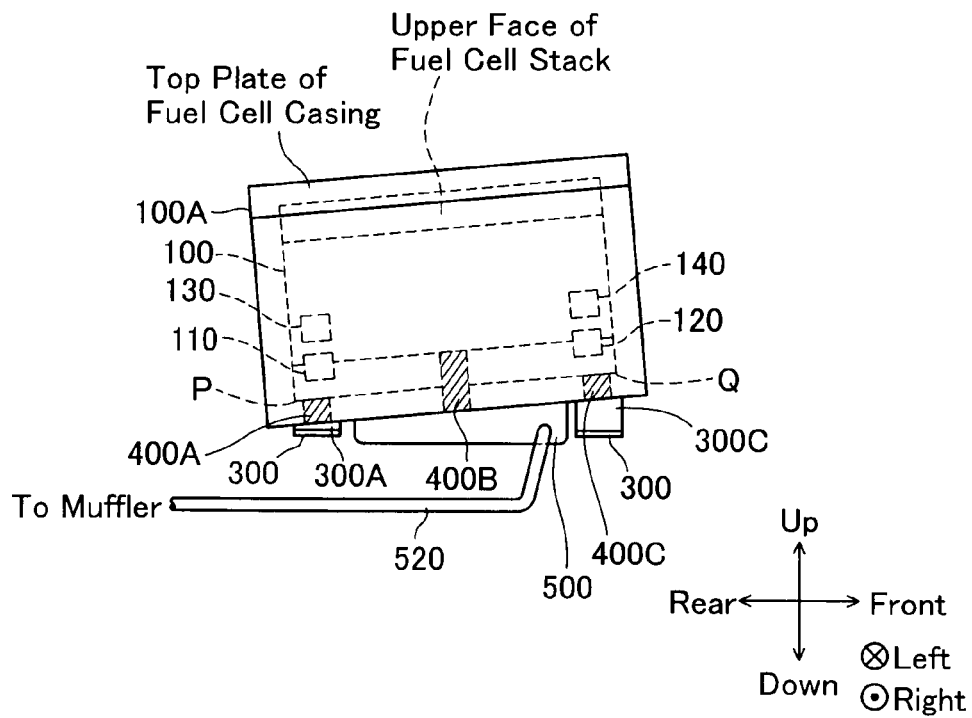
FIG. 3 shows the periphery of the fuel cell stack 100 in the left direction in the vehicle 1000.
Figure 4:
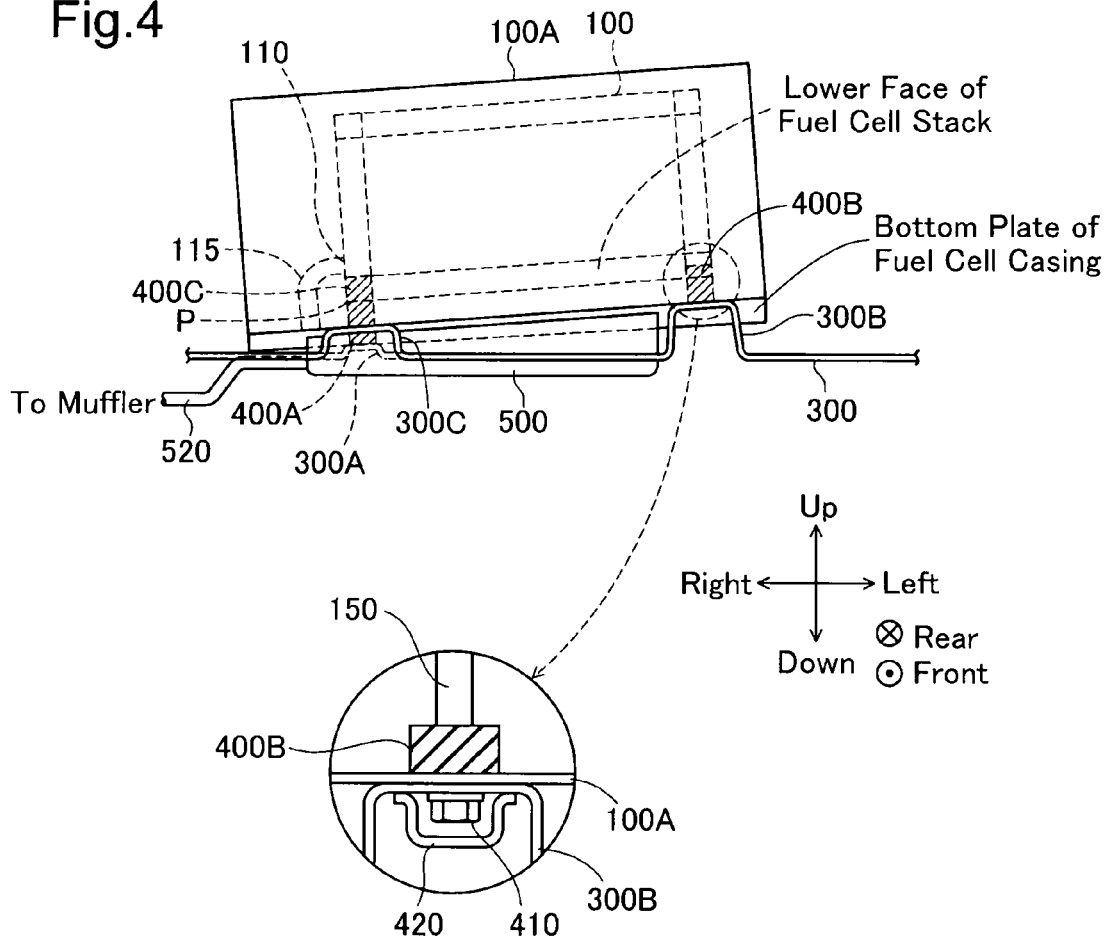
FIG. 4 shows the periphery of the fuel cell stack 100 in the rear direction in the vehicle 1000.
Figure 5:
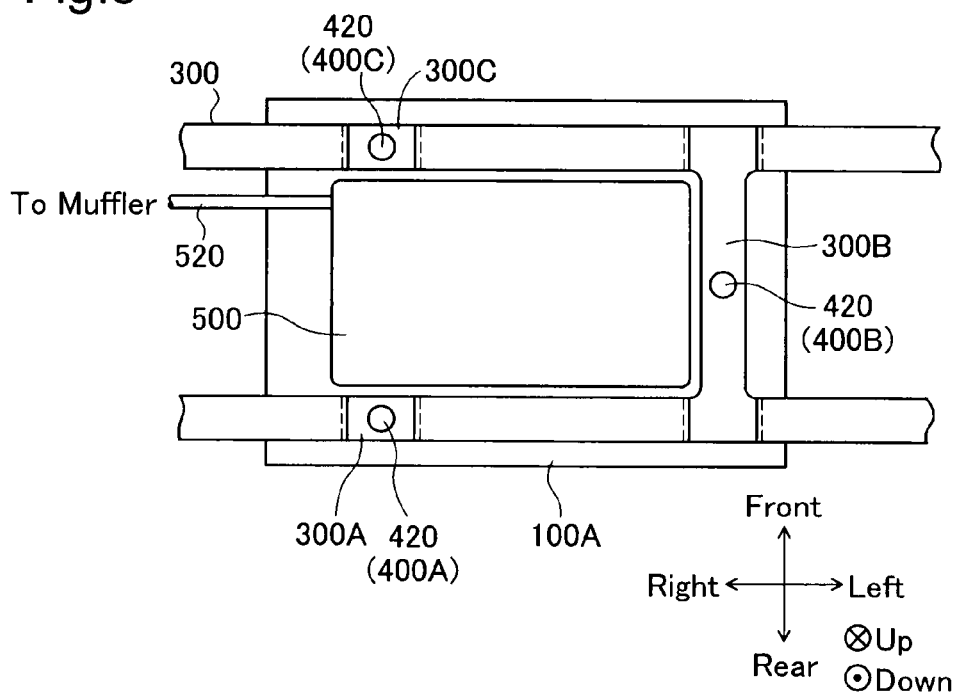
FIG. 5 shows the periphery of the fuel cell stack 100 in the up direction in the vehicle 1000.

FIG. 3 shows the periphery of the fuel cell stack 100 in the left direction in the vehicle 1000. FIG. 4 shows the periphery of the fuel cell stack 100 in the rear direction in the vehicle 1000. FIG. 5 shows the periphery of the fuel cell stack 100 in the up direction in the vehicle 1000. The fuel cell stack 100 is attached to a support member 300 via mounts 400A, 400B, and 400C as shown in FIGS. 3 through 5. The support member 300 has three convexes of different heights 300A, 300B, and 300C. The height of the convexes increases in the order of 300A, 300C, and 300B. The mounts 400A, 400B, and 400C are made of a rubber material.

The attachment of the fuel cell stack 100 to the support member 300 is explained in detail. As shown in FIG. 4, the end plates 150 of the fuel cell stack 100 are fastened to a bottom plate of the fuel cell casing 100A and the respective convexes 300A, 300B, and 300C of the support member 300 via the mounts 400A, 400B, and 400C with mount bolts 410. The fuel cell stack 100 is arranged to locate the apex P closest to the convex 300A among the eight convexes. Namely the fuel cell stack 100 is inclined to have the apex P as the lowermost point. Each mount bolt 410 is covered with an insulating mount cover 420. The mounts 400A, 400B, and 400C and the support member 300 are omitted from the illustrations of FIGS. 1 and 2, while being simplified with omission of the mount bolts 410 and the mount covers 420 in the illustrations of FIGS. 3 through 5. The support member 300 is fastened to the side frame 930.

In the configuration of this embodiment, the fuel cell stack 100 is inclined at an angle of $\alpha$ degrees in the front-rear direction and at an angle of $\beta$ degrees in the left-right direction. The angle $\alpha$ is preferably in the range of 10 to 30 degrees and more preferably in the range of 15 to 20 degrees. The angle $\beta$ is preferably in the range of 3 to 10 degrees and more preferably in the range of 3 to 5 degrees.

As shown in FIG. 3, the end plate 150 of the fuel cell stack 100 has the fuel gas exhaust port 110 located in the vicinity of the apex P and the oxidizing gas exhaust port 120 in the vicinity of an apex Q. The oxidizing gas exhaust port 120 connects with the oxidizing gas exhaust manifold to discharge the oxidizing gas out of the fuel cell stack 100. The end plate 150 also has a fuel gas supply port 130 formed to supply the fuel gas to the fuel gas supply manifold and an oxidizing gas supply port 140 formed to supply the oxidizing gas to the oxidizing gas supply manifold.

As shown in FIG. 4, the fuel gas exhaust port 110 also connects with a fuel gas introduction pipe 115 arranged to introduce the unconsumed fuel gas from the fuel gas exhaust manifold 160 to a diluter 500 described later. The oxidizing gas exhaust port 120 connects with an oxidizing gas introduction pipe 117 arranged to introduce the unconsumed oxidizing gas from the oxidizing gas exhaust manifold to the diluter 500, although such connection is not specifically illustrated in FIGS. 3 through 5.

In the vehicle 1000 of the embodiment, the diluter 500 is located in a space (space K) formed below a lower face (bottom face) of the fuel cell stack 100 and under the bottom plate of the fuel cell casing 100A as shown in FIGS. 3 through 5.

Figure 6:
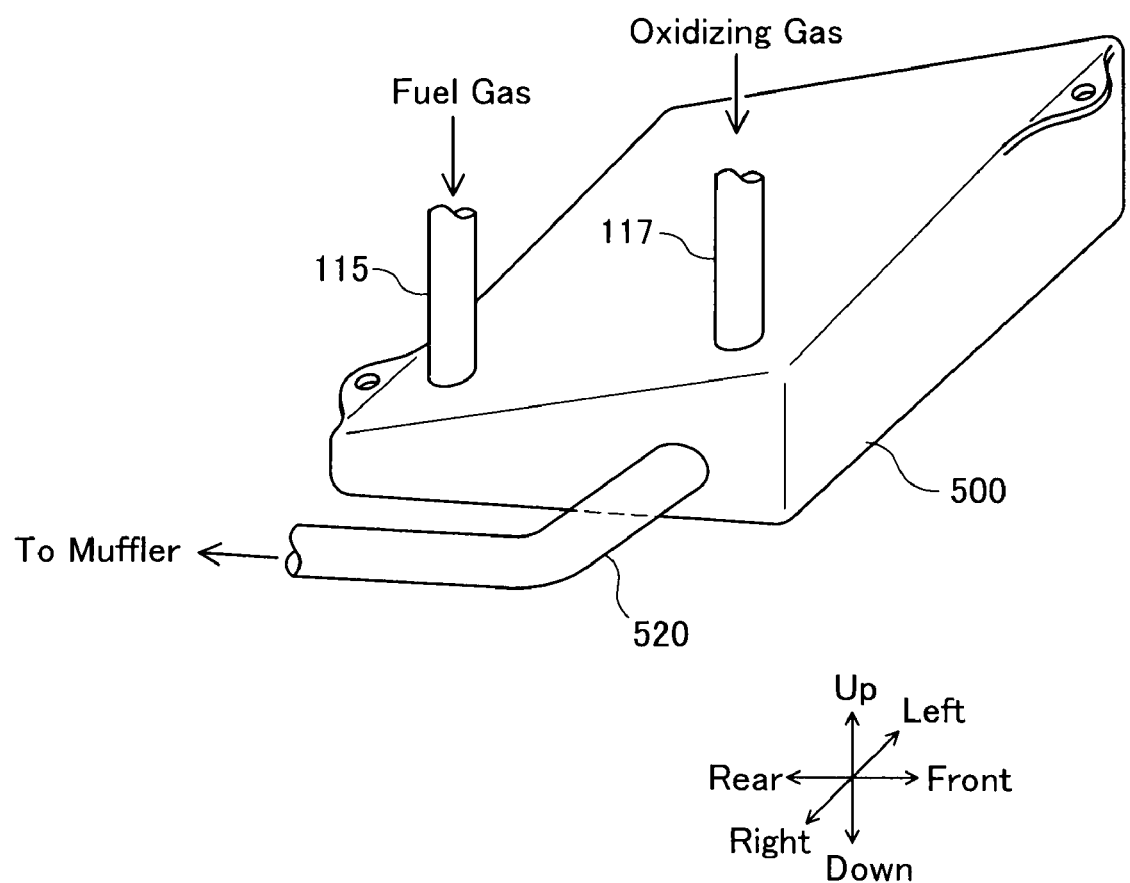
FIG. 6 schematically shows the appearance of a diluter 500.

FIG. 6 schematically shows the appearance of the diluter 500. As illustrated, the diluter 500 connects with the fuel gas introduction pipe 115, the oxidizing gas introduction pipe 117, and a diluted gas discharge pipe 520. The diluter 500 is structured to mix and dilute the fuel gas introduced from the fuel gas introduction conduit 115 with the oxidizing gas introduced from the oxidizing gas introduction conduit 117. The diluted gas is discharged from the diluter 500 through the diluted gas discharge pipe 520 to the muffler. The diluter 500 has an upper face (top cover) formed along the bottom plate of the fuel cell casing 100A as shown in FIG. 6. The diluter 500 is located in the space K in this space-saving manner.

As described above, in the vehicle 1000 of the embodiment, the fuel cell stack 100 is arranged to locate the apex P closest to the fuel gas exhaust port 110 among the eight apexes of the fuel cell stack 100 on the rear side in the front-rear direction and on the right side in the left-right direction and is inclined to have the apex P as the lowermost point. While the vehicle 1000 runs on an upslope, the fuel gas exhaust port 110 is continuously positioned in the vicinity of the lowermost point of the fuel cell stack 100. Water produced at the anodes of the respective unit cells is thus collectable to the fuel gas exhaust manifold 160 by taking advantage of the gravity. The collected water is then dischargeable from the fuel gas exhaust port 110 by taking advantage of the gravity. This arrangement effectively controls the occurrence of flooding in the respective unit cells of the fuel cell stack 100 and prevents a decrease in power generation efficiency of the fuel cell stack 100 to ensure the smooth drive of the vehicle 1000. These effects are also expected while the vehicle 1000 runs on a gentle downhill slope having a lower inclination than the angle α degrees.

The amount of the reactive gas discharged from the anodes is generally less than the amount of the reactive gas discharged from the cathodes. In the vehicle 1000 of the embodiment, the fuel gas exhaust port 110 is thus located closer to the apex P as the lowermost point of the fuel cell stack 100 than the oxidizing gas exhaust port 120. This arrangement enables water produced at the anodes of the respective unit cells in the fuel cell stack 100 to be efficiently collected to the fuel gas exhaust manifold 160 by taking advantage of the gravity and enables the collected water to be efficiently discharged from the fuel gas exhaust port 110 by taking advantage of the gravity.

In the vehicle 1000 of the embodiment, the end plates 150 of the fuel cell stack 100 are fastened to the support member 300 by means of the mounts 400A, 400B, and 400C. The fuel cell stack 100 is thus securely fixable to and supportable by the support member 300. The rubber mounts 400 are interposed between the end plates 150 of the fuel cell stack 100 and the support member 300 to relieve the external force applied to the vehicle 1000 and transmitted to the support member 300.

In the vehicle 1000 of the embodiment, the diluter 500 is located in the space K in the space-saving manner. This arrangement ensures the efficient use of the space K produced by the inclined arrangement of the fuel cell stack 100.

There is a relatively sufficient space in the vertical direction below the driver's seat or passenger seat 910 in the vehicle 1000. In the vehicle 1000 of the embodiment, the fuel cell stack 100 is thus located below the driver's seat or passenger seat 910. This arrangement ensures the efficient use of the space in the vehicle 1000.

The vehicle 1000 of the embodiment corresponds to the moving body in the claims of the invention. The fuel gas exhaust port 110 and the oxidizing gas exhaust port 120 of the embodiment respectively correspond to the fuel gas exhaust port and the oxidizing gas exhaust port in the claims of the invention. The support member 300 of the embodiment corresponds to the support member in the claims of the invention. The mounts 400A, 400B, and 400C of the embodiment are equivalent to the mount in the claims of the invention. The mount bolts 410 of the embodiment are equivalent to the mount fixation member in the claims of the invention. The diluter 500 of the embodiment corresponds to the fluid introduction assembly in the claims of the invention. The apex P of the embodiment is equivalent to the 'specific corner closest to the fuel gas exhaust port' in the claims of the invention.

B. Other Aspects

The embodiment discussed above is to be considered in all aspects as illustrative and not restrictive. There may be many modifications, changes, and alterations without departing from the scope or spirit of the main characteristics of the present invention.

B1. Modified Example 1

In the vehicle 1000 of the embodiment, the fuel gas exhaust port 110 is formed to face rightward. This orientation is, however, neither essential nor restrictive. The orientation of the fuel gas exhaust port 110 may be set arbitrarily as long as the apex P closest to the fuel gas exhaust port 110 is located as the lowermost point of the fuel cell stack 100 in the vehicle 1000. For example, the end plate 150 with the fuel gas exhaust port 110 and the other ports may be arranged to face rearward in the fuel cell stack 100. In this layout, the fuel gas exhaust port 110 is formed to face rearward. This arrangement has the similar effects to those of the embodiment.

B2. Modified Example 2

The vehicle 1000 of the embodiment has the diluter 500 located in the space K. This layout is, however, neither essential nor restrictive. A gas liquid separator or another peripheral device of the fuel cell stack 100 may be located in the space K, instead of the diluter 500. This modified layout also ensures the efficient use of the space K produced by the inclined arrangement of the fuel cell stack 100.

B3. Modified Example 3

The embodiment regards the vehicle 1000 as the moving body equipped with the fuel cell stack 100. The present invention is, however, not restricted to the vehicle 1000 but may be applied to any of other various moving bodies, for example, a linear motor car, a ship or boat, an airplane, or a robot, equipped with the inclined arrangement of the fuel cell stack 100. The fuel gas exhaust port 110 is continuously positioned in the vicinity of the lowermost point of the fuel cell stack 100, while the moving body runs upward (sails or flies upward). Water produced at the anodes of the respective unit cells is thus collectable to the fuel gas exhaust manifold 160 by taking advantage of the gravity. The collected water is then dischargeable from the fuel gas exhaust port 110 by taking advantage of the gravity. This arrangement effectively controls the occurrence of flooding in the respective unit cells of the fuel cell stack 100 and prevents a decrease in power generation efficiency of the fuel cell stack 100 to ensure the smooth drive (cruise or flight) of the moving body.

B4. Modified Example 4

In the vehicle 1000 of the embodiment, the upper face (top cover) of the diluter 500 is constructed as a separate part from the bottom plate of the fuel cell casing 100A. The top cover of the diluter 500 may, however, also be used as the bottom plate of the fuel cell casing 100A. This modified arrangement desirably reduces the total number of parts and reduces the total weight of the vehicle 1000.

B5. Modified Example 5

In the vehicle 1000 of the embodiment, only the apex P is located as the lowermost point of the fuel cell stack 100. This orientation is, however, neither essential nor restrictive. For example, the fuel cell stack 100 may have no inclination in the left-right direction (that is, β=0), so that an apex R (see FIG. 2) as well as the apex P in the left-right direction are located as lowermost points of the fuel cell stack 100. In this modified layout, the fuel gas exhaust port 110 is continuously positioned in the vicinity of the lowermost point of the fuel cell stack 100, while the vehicle 1000 runs on an upslope. Water produced at the anodes of the respective unit cells is thus efficiently collectable to the fuel gas exhaust manifold 160 by taking advantage of the gravity. The collected water is then dischargeable with the fuel gas from the fuel gas exhaust port 110. This arrangement effectively controls the occurrence of flooding in the respective unit cells of the fuel cell stack 100 and prevents a decrease in power generation efficiency of the fuel cell stack 100 to ensure the smooth drive of the vehicle 1000.

B6. Modified Example 6

In the vehicle 1000 of the embodiment, the fuel cell stack 100 is arranged to locate the apex P closest to the fuel gas exhaust port 110 among the eight apexes of the fuel cell stack 100 on the rear side in the front-rear direction and on the right side in the left-right direction and is inclined to have the apex P as the lowermost point. This orientation is, however, neither essential nor restrictive. The fuel cell stack 100 may be inclined in any other suitable orientation. In this modified layout, the diluter 500, the gas liquid separator, or another peripheral device of the fuel cell stack 100 may be located in the space produced by the inclined arrangement of the fuel cell stack 100. This modified arrangement also ensures the efficient use of the space.

B7. Modified Example 7

In the vehicle 1000 of the embodiment described above, the fuel cell stack 100 has the quasi-cube shape. The shape of the fuel cell stack 100 is, however, not restricted to the quasi-cube shape but may be a polygonal (for example, pentagonal or hexagonal) columnar shape. Each apex corresponds to each corner in the claims of the invention. The fuel cell stack 100 may be formed as a columnar structure having apexes in a curved shape (curved apexes). In this case, each curved apex corresponds to each corner in the claims of the invention.

The invention claimed is:

1. A moving body equipped with fuel cells structured to have multiple corners,
wherein the fuel cells have a fuel gas exhaust port formed to discharge a fuel gas, which is subjected to an electrochemical reaction at anodes of the fuel cells, out of the fuel cells, and
the fuel cells are arranged to be inclined to a horizontal plane to position a front side of the fuel cells in a forward direction of the moving body higher than an opposite side of the fuel cells in the forward direction of the moving body and are provided to locate a specific corner closest to the fuel gas exhaust port of the fuel cells among the multiple corners as a lowermost point.

2. The moving body in accordance with claim 1, wherein the fuel cells have an oxidizing gas exhaust port formed to discharge an oxidizing gas, which is subjected to an electrochemical reaction at cathodes of the fuel cells, out of the fuel cells, and
the fuel gas exhaust port is provided at a position closer to the specific corner as the lowermost point than at least the oxidizing gas exhaust port in the fuel cells.

3. The moving body in accordance with claim 1, wherein the fuel cells are structured as a cell laminate of multiple separators and multiple membrane electrode assemblies and have an end plate with the fuel gas exhaust port formed therein,
the moving body having:
a support member provided to support the fuel cells and arrange the fuel cells in an inclined orientation;
a mount fastened to the support member and at least partly made of an elastic material; and
a mount fixation member provided to fix the mount to the end plate of the fuel cells.

4. The moving body in accordance with claim 1, wherein the moving body includes a fluid introduction assembly located in a space formed below a lower face of the fuel cells, which includes the lowermost point, and arranged to introduce an exhaust fluid from the fuel cells.

5. The moving body in accordance with claim 4, wherein the fluid introduction assembly is either a diluter or a gas liquid separator.

6. The moving body in accordance with claim 1, wherein the moving body is a vehicle.

7. The moving body in accordance with claim 6, wherein the fuel cells are located under a driver's seat or passenger seat.

8. A moving body equipped with fuel cells,
wherein the fuel cells are arranged to be inclined to a horizontal plane,
the moving body having a fluid introduction assembly located in a space formed below a lower face of the fuel cells, which includes a specific corner of the fuel cells as a lowermost point, and arranged to introduce an exhaust fluid from the fuel cells.

9. The moving body in accordance with claim 8, wherein the fluid introduction assembly is either a diluter or a gas liquid separator.

10. The moving body in accordance with claim 8, wherein the moving body is a vehicle.

11. The moving body in accordance with claim 10, wherein the fuel cells are located under a driver's seat or passenger seat.

* * * * *